Patented Nov. 3, 1931

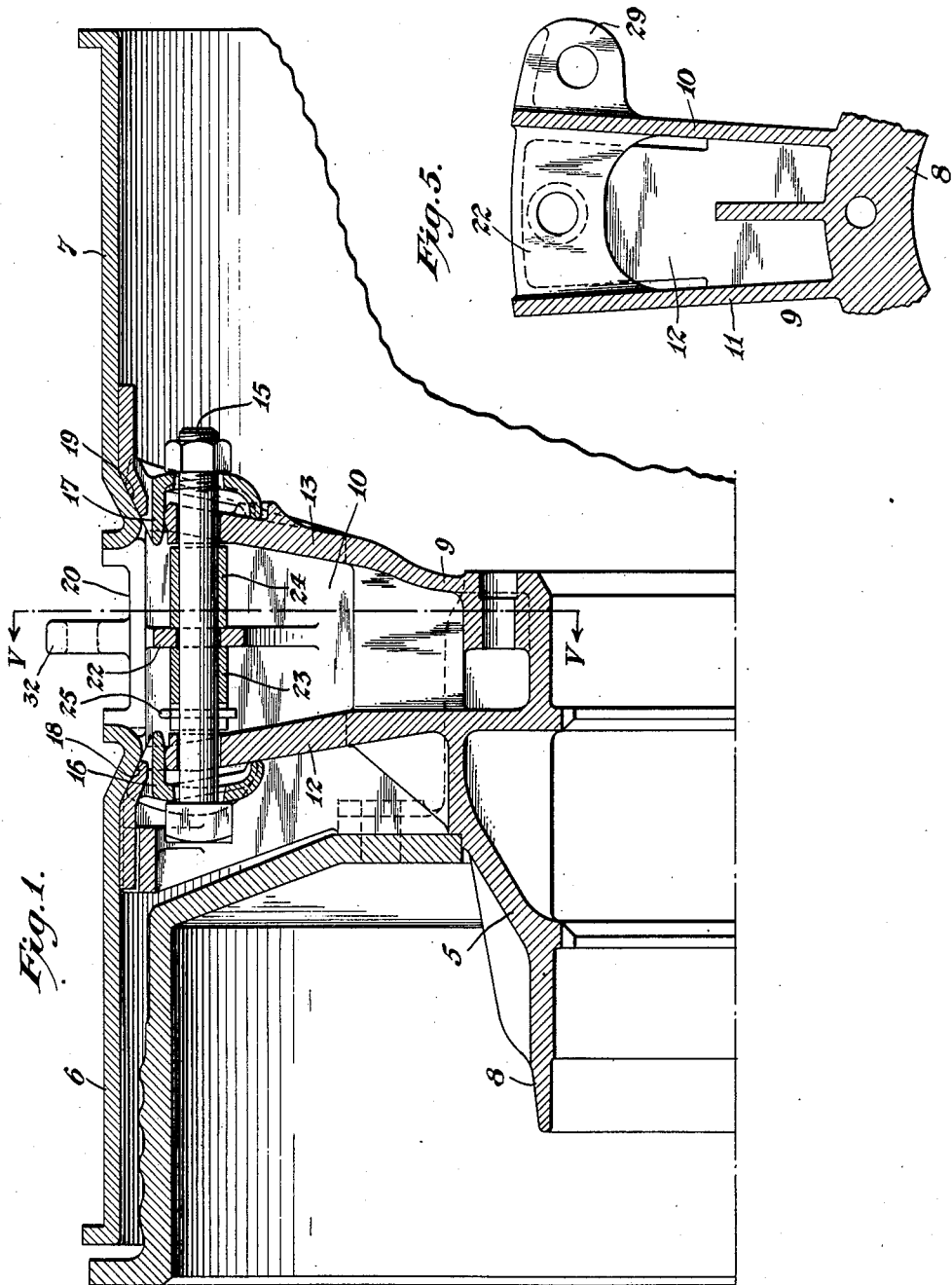

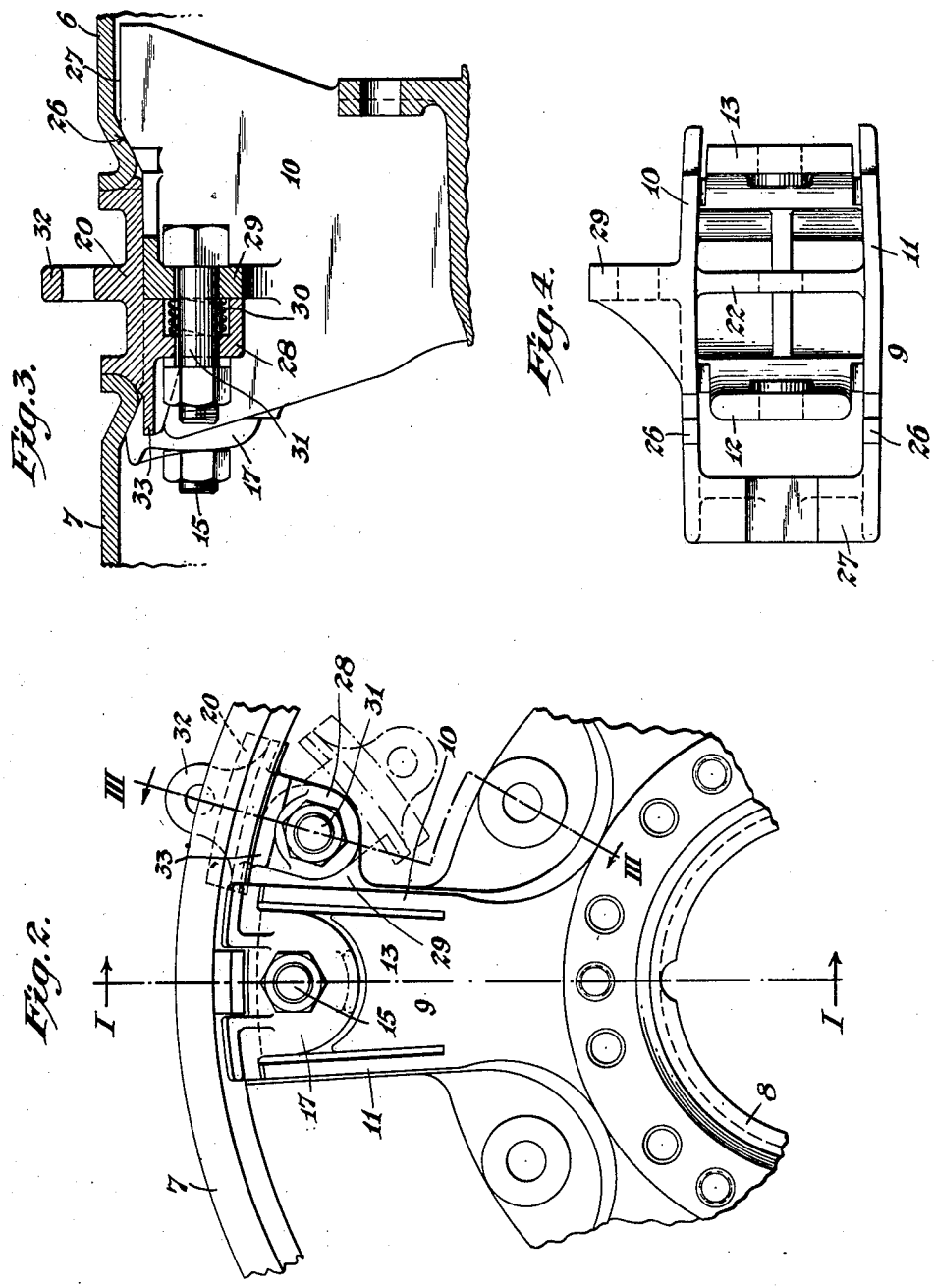

1,830,396

UNITED STATES PATENT OFFICE

JOHN W. HOLT, OF CLEVELAND HEIGHTS, OHIO

MOUNTING FOR DUAL RIMS

Application filed October 22, 1927. Serial No. 227,891.

The present invention relates to wheels and has for an object to provide an improved demountable rim vehicle wheel. The invention has been developed more particularly in the production of a dual rim vehicle wheel having a cast metal spider and two demountable tire carrying rims such as commonly used on heavy automobile trucks and the like, and for convenience of disclosure such an embodiment of the invention will be described.

The nature and objects of the invention will more clearly appear from a description of the selected embodiment for the purpose of which description reference should be had to the accompanying drawings forming a part hereof and in which—

Figure 1 is a central sectional view showing the spoke structure and the connections between the detachable rim and spoke, taken on the line I—I of Fig. 2, Figure 2 is a side view of the same, Figure 3 is a detail sectional view taken on the line III—III of Fig. 2, Figure 4 is a plan view showing the ends of the spoke, and Figure 5 is a sectional view taken on the line V—V of Fig. 1.

In the structure shown for the purpose of illustrating the invention, a cast metal spider 5 which may be of malleable iron supports two demountable rims 6 and 7. The spider is formed to provide a hub 8 with a plurality of spokes 9 radiating therefrom. Each spoke is substantially rectangular in form, as shown in the section Fig. 5 and and comprises two webs 10, 11 lying in substantially radial planes and extending axially and two other axially diverging webs 12, 13 lying substantially in the plane of the wheel. The webs 12, 13 are thin enough to constitute laterally flexible members on which the demountable rims are supported. The spoke is divided in the plane of the wheel to form the two slightly flexible members 12 and 13 while the webs 10, 11 overlie the edges thereof to provide a neat appearance. Suitable means is provided for mounting the demountable rims on said flexible members. In the structure shown, the flexible members 12 and 13 of each pair are similarly apertured to receive a clamping bolt 15 on which bolt are mounted suitable wedge clamp members 16 and 17 which engage respectively divergently tapered seats 18 and 19 at the adjacent sides of the rims. The clamp 16 is preferably formed with flanges positioned to prevent turning of the head of the bolt 15. The rims are held in spaced relation by suitable spacers 20, the edges of which conform to the shape of the rims whereby tightening of the bolts 15 tightens the rims in spaced relation on the spider. The flexibility of the members 12 and 13 is sufficient to insure a firm clamping of the rims and preferably the outer member 13 is somewhat the more flexible so that it will yield first during the tightening of the bolts.

The bolts 15 preferably are engaged by webs 22 which connect the rigid webs or walls 10, 11 of each spoke and lie approximately midway between the flexible members 12 and 13, thus providing, in effect, a rigid central portion between said flexible portions. The flexing of the lateral spoke members 12 and 13 is preferably limited by sleeves 23 and 24 mounted on the bolt 15 between the web 22 and bosses on said spoke members. A cotter pin 25 extending transversely through the bolt 15 at a suitable place prevents the bolt from falling out when its nut is removed.

It is one of the features of the structure shown that when the rim is placed upon the spider in the process of assembling the wheel, it will be held in approximately the same position as that in which it is finally clamped when the clamping bolts are tightened. As shown, each web member 10 extends inward beyond the flexible wall 12 and is provided with a tapered bearing portion 26 and a straight bearing portion 27 to receive the inner rim 6, the bearing portions being suitably designed for the purpose noted.

When assembling the wheel, after the rim 6 is in place, the spacer members 20 are positioned to engage the outer edge of the rim and hold it in place. Preferably, each spacer 20 is movably attached to its spoke in such manner that while still being mounted on the spoke, it can be moved to and from operative rim engaging position. As shown in Fig. 3, the spacer 20 is formed with an inwardly projecting lug 28 through which it is bolted to a suitable lug 29 projecting from the web 10, as best shown in Figs. 2 and 3. In order that the spacer may be held readily either in its operative rim engaging position or folded back toward the hub of the spider in inoperative position, as shown in dotted lines in Fig. 2, a friction spring 30 is mounted in a recess within the lug 28 and surrounding the bolt 31 upon which the spacer is carried. The upstanding apertured lugs 32 of the spacers facilitate adjustment of the spacers by providing easy engagement by a tool. After the spacers 20 are placed in rim engaging position, the bolts 31 may be tightened to hold the rim 6 in position. The spacers 20 may be formed with projections 33 adapted temporarily to support the rim 7 when it is applied to the wheel and before the clamp member 17 is secured in place. With both rims in place, the wedge clamp members 16, 17 are tightened by the bolts 15 to rigidly secure the two rims at their adjacent edges to the spider. It will be noted that the movement of the spoke members 12, 13 toward each other as the bolts 15 are tightened is accompanied by a slight radially outward movement of their outer ends because of the divergence thereof thus insuring the rigidity of the wheel and in the reverse operation, that is in loosening of the bolts, facilitating the removal of the rims.

The description of a particular embodiment is illustrative merely and not intended as defining the limits of the invention.

What I claim is:—

1. A vehicle wheel comprising a cast metal spider and a demountable rim, said spider having axially diverging flexible spoke members and clamping means for drawing said flexible spoke members toward each other to expand the ends thereof radially within the rim.

2. A dual vehicle wheel comprising a spider having pairs of axially diverging spoke members flexible axially toward each other to expand the same within the rims, a pair of demountable rims carried by said spoke members and having at their adjacent sides oppositely tapered seats, spacers between said demountable rims holding the same in spaced relation and means carried by said spoke members engaging said oppositely tapered seats and arranged to be drawn together to flex said spoke members toward each other and to clamp said demountable rims in position.

3. A dual vehicle wheel as defined in claim 2 wherein one set of flexible spoke members is more flexible than the other.

4. A dual vehicle wheel comprising a spider having axially diverging spoke members flexible axially toward each other, a pair of demountable rims having at their adjacent sides divergently tapered seats, spacers separating said rims, oppositely disposed wedge clamp members carried by the flexible spoke members and engaging said divergently tapered seats, and bolts for holding said clamp members in rim supporting position and said flexible spoke members toward each other.

5. A dual vehicle wheel comprising a spider having axially diverging spoke members flexible axially toward each other, a pair of demountable rims having at their adjacent sides divergently tapered seats, spacers separating said rims, oppositely disposed wedge clamp members carried by the flexible spoke members and engaging said divergently tapered seats, means for limiting the flexure of said spoke members toward each other, and bolts for flexing said flexible spoke members toward each other and holding said clamp members in rim supporting position.

6. A dual vehicle wheel comprising a cast metal spider having a plurality of spokes each spoke comprising a rigid central portion and axially diverging flexible side portions, a pair of demountable rims having at their adjacent sides divergently tapered seats, spacers separating said rims, oppositely disposed wedge clamp members carried by the flexible spoke members and engaging said divergently tapered seats, and bolts each passing through a rigid central portion and two flexible side portions of a spoke and the clamp members carried thereby to hold the clamp members in rim supporting position.

7. A dual vehicle wheel comprising a cast metal spider having a plurality of spokes each spoke comprising a rigid central portion and diverging flexible side portions, a pair of demountable rims having at their adjacent sides divergently tapered seats, spacers separating said rims, oppositely disposed wedge clamp members carried by the flexible spoke members and engaging said divergently tapered seats, and bolts each passing through a rigid central portion and two flexible side portions of a spoke and the clamp members carried thereby to hold the clamp members in rim supporting position, together with spacing members carried by said bolts and arranged to limit the movement of each flexible side portion toward the rigid central portion.

8. A dual vehicle wheel comprising a cast metal spider having a plurality of spokes, each spoke comprising a web member extending axially of the wheel and diverging laterally flexible rim supporting members, a pair of demountable rims having at their adjacent sides divergently tapered seats, spacers separating said rims, oppositely disposed wedge clamp members carried by respective flexible spoke members and engaging said divergently tapered seats, and bolts each passing through two flexible spoke members and the clamp members carried thereby to hold the clamp members in rim supporting position, said axial web member having a rim supporting tapered portion adjacent said divergently tapered seats arranged to support one of said demountable rims when said bolts are loosened, substantially as and for the purpose described.

9. A dual vehicle wheel as defined in claim 8 wherein one set of laterally flexible members is more flexible than the other.

10. A dual vehicle wheel comprising a spider with a plurality of spokes, each spoke comprising a rigid web member extending axially of the wheel and laterally flexible rim supporting portions, the said web member having a portion projecting between said flexible portions; a pair of demountable rims having at their adjacent sides divergently tapered seats; spacers separating said rims; oppositely disposed wedge clamp members carried by the respective flexible spoke members and engaging said divergently tapered seats; and bolts each passing through two flexible spoke members, the projection of the rigid member, and the clamp members carried thereby to hold the clamp members in rim supporting position; together with means for limiting the movement of each flexible spoke member toward said central rigid portion; substantially as described.

11. A dual vehicle wheel comprising a cast metal spider having a plurality of spokes, each spoke comprising a central rigid portion and laterally flexible rim supporting portions on either side of said central rigid portion, means for limiting the movement of each of said flexible rim supporting spoke members, a pair of demountable rims having at their adjacent sides divergently tapered seats, a spacer element between said rims, and bolts each passing through two flexible spoke members in rim supporting position.

12. A dual vehicle wheel comprising a cast metal spider having a plurality of spokes, each spoke comprising circumferentially spaced axially extending rigid members, a circumferential web connecting said rigid members and axially spaced circumferentially extending resilient members, a pair of demountable rims having at their adjacent sides divergently tapered seats, spacers for said rims oscillatably mounted on said rigid members movable into and out of alignment with said rims, oppositely disposed wedge clamp members carried by said flexible members and engaging said divergently tapered seats, and bolts each passing through said web connecting said rigid members, said flexible members and said clamp members to hold the clamp members in rim-supporting position.

13. A dual vehicle wheel as defined in claim 12, wherein one set of flexible spoke members is more flexible than the other.

JOHN W. HOLT.